(12) United States Patent
Morino et al.

(10) Patent No.: US 8,449,419 B2
(45) Date of Patent: May 28, 2013

(54) POWER TRANSMISSION BELT AND METHOD OF PRODUCING THE SAME

(75) Inventors: Takuro Morino, Susono (JP); Michio Yoshida, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/063,558

(22) PCT Filed: Aug. 28, 2009

(86) PCT No.: PCT/JP2009/004234
§ 371 (c)(1),
(2), (4) Date: Mar. 11, 2011

(87) PCT Pub. No.: WO2011/024236
PCT Pub. Date: Mar. 3, 2011

(65) Prior Publication Data
US 2012/0190490 A1    Jul. 26, 2012

(51) Int. Cl.
*F16G 5/16* (2006.01)
(52) U.S. Cl.
USPC .......................................................... 474/245
(58) Field of Classification Search
CPC ...................................... F16G 5/16; F16G 5/18
USPC ................. 474/237, 240, 242, 244, 245, 246, 474/265, 238
See application file for complete search history.

(56) References Cited

U.S. PATENT DOCUMENTS

| | | | | |
|---|---|---|---|---|
| 5,019,020 A | * | 5/1991 | van Lith | 474/240 |
| 6,334,830 B1 | * | 1/2002 | Yagasaki et al. | 474/242 |
| 6,705,963 B2 | * | 3/2004 | Smeets et al. | 474/242 |
| 7,066,858 B2 | * | 6/2006 | Smeets | 474/242 |
| 7,169,071 B2 | * | 1/2007 | Miura et al. | 474/242 |
| 8,100,797 B2 | * | 1/2012 | Prinsen | 474/242 |

(Continued)

FOREIGN PATENT DOCUMENTS

| | | |
|---|---|---|
| JP | A 2001-173729 | 6/2001 |
| JP | A-2005-221010 | 8/2005 |

(Continued)

OTHER PUBLICATIONS

Oct. 30, 2012 Decision to Grant a Patent issued in Japanese Patent Application No. 2011-510600 (with translation).

(Continued)

*Primary Examiner* — William E Dondero
(74) *Attorney, Agent, or Firm* — Oliff & Berridge, PLC

(57) ABSTRACT

A power transmission belt low in cost and preventing work precision from being lowered and life expectancy of a metal press working mold from being decreased and a method of producing such a power transmission belt are provided. The power transmission belt includes endless band-like rings, and a plurality of elements bonded into an annular shape by the endless band-like rings. Each of the elements has both side end surface portions pressed between pulleys in the belt width direction, a rocking edge portion serving as a fulcrum when rocked in the state that the elements are partly wound around the pulleys, and a concave-convex portion engageable in concave-convex engagement with the concave-convex portions of a pair of neighboring elements. Each of the elements is formed with a curved inclination surface between the rocking edge portion and the concave-convex portion to have an inclination angle reduced toward the concave-convex portion.

12 Claims, 14 Drawing Sheets

U.S. PATENT DOCUMENTS

| | | | |
|---|---|---|---|
| 2002/0138986 A1* | 10/2002 | Wakui | 29/892 |
| 2003/0162616 A1* | 8/2003 | Miura et al. | 474/242 |
| 2009/0280940 A1* | 11/2009 | Toyohara et al. | 474/242 |
| 2010/0227719 A1* | 9/2010 | Prinsen | 474/148 |

FOREIGN PATENT DOCUMENTS

| | | |
|---|---|---|
| JP | A 2006-266363 | 10/2006 |
| JP | A 2008-051322 | 3/2008 |
| JP | A 2008-051323 | 3/2008 |
| JP | A 2008-051327 | 3/2008 |
| JP | B2 4132820 | 8/2008 |
| WO | WO 01/78919 A1 | 10/2001 |

OTHER PUBLICATIONS

International Search Report issued in PCT/JP2009/004234, mailed Nov. 24, 2009. (with English-language translation.).

* cited by examiner

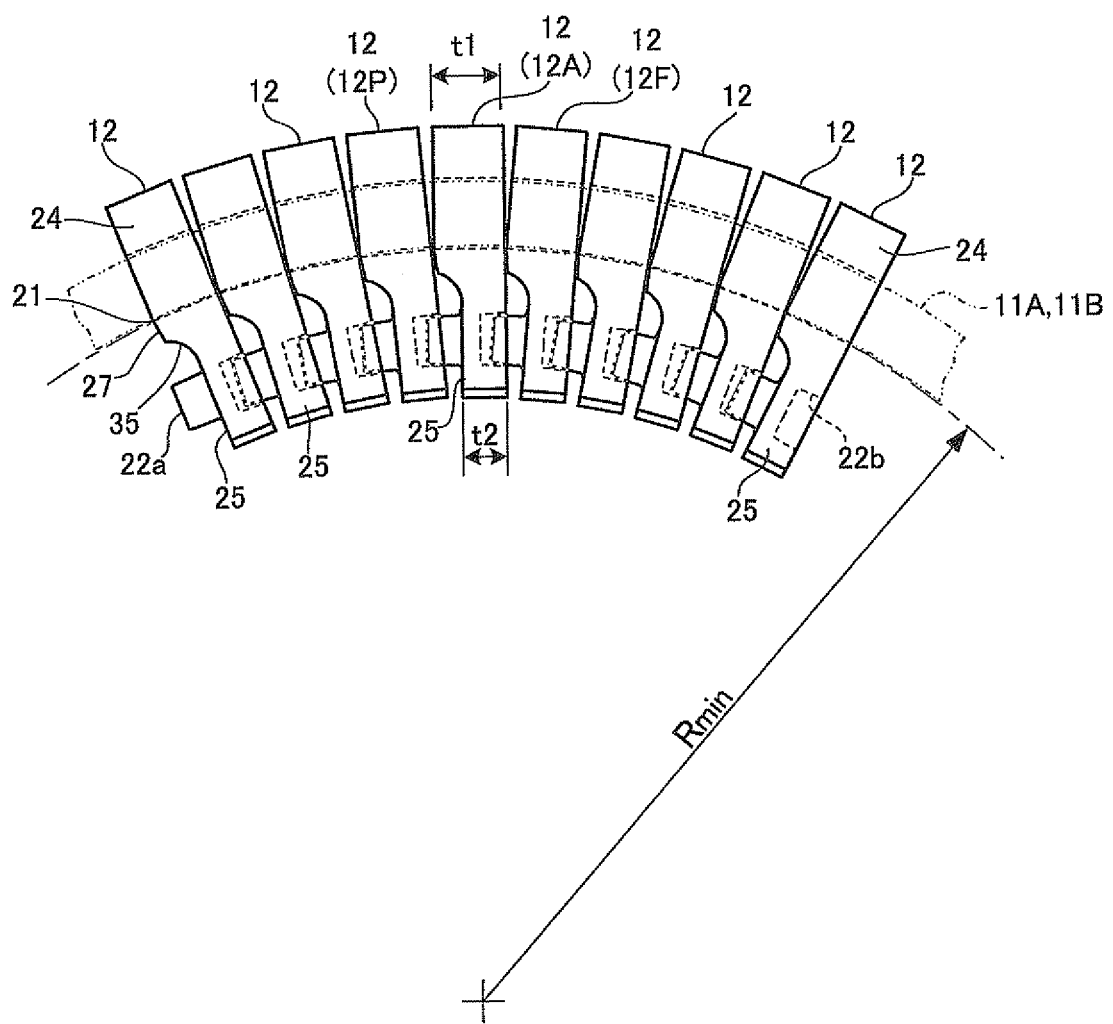

POWER TRANSMISSION BELT AND METHOD OF PRODUCING THE SAME

TECHNICAL FIELD

The present invention relates to a power transmission belt and a method of producing the same, and in particular to a power transmission belt preferable for a belt type continuously variable transmission and a method of producing the same.

BACKGROUND ART

There has so far been known a belt type power transmission apparatus as a vehicular continuously variable transmission (hereinafter simply referred to as "CVT"). The belt type power transmission apparatus comprises a drive side pulley and a driven side pulley respectively serving as movable sheaves, and an endless power transmission belt wound around the drive side pulley and the driven side pulley. The power transmission belt to be used for such a CVT is constituted by an endless band-like ring serving as a core material, and a multiplicity of elements each having a predetermined thickness in the axial direction of the endless band-like ring and retained by the endless band-like ring. The elements are subject to being pressed toward the axial direction of the endless band-like ring and serve to impart tensions to the endless band-like ring to transmit torque from the drive side pulley to the driven side pulley.

As this type of the power transmission belt, there is known a power transmission belt which is formed in the outer circumferential portion of the power transmission belt with a concave portion for accommodating, for example, an endless band-like ring, and has contact surfaces to be in contact with the pulleys and formed at the both end portions of the elements. An engagement portion having two neighboring elements engaged in concave-convex engagement with each other in the thickness direction of the element is formed at the inner end portion side of the element occupying the inner circumferential side of the power transmission belt (see, for example, Patent Document 1). The power transmission belt is constructed to have the concave portion of the element enlarged toward the inner bottom side portion of the concave portion from the opening side portion of the concave portion, and to have a plurality of endless band-like rings each having a width smaller than that of the opening of the concave portion accommodated in the concave portion of the element in side-by-side relationship with each other, thereby facilitating the elements to be assembled with the endless band-like rings.

As another power transmission belt, there is known a power transmission belt which comprises a multiplicity of elements each having a pair of left and right concave portions opened at the both side ends of the elements in the width direction of the power transmission belt to receive therein two endless band-like rings respectively, thereby enabling the multiplicity of elements to be retained by the two endless band-like rings. The known power transmission belt is constructed to have an engagement portion having two neighboring elements engaged in concave-convex engagement to be formed at the outer end portion of the element positioned outwardly of the endless band-like rings. The known power transmission belt is formed with contact surfaces to be in contact with the pulleys at the both sides of the elements in the width direction of the power transmission belt and at the inner end portions of the elements positioned inwardly of the endless band-like rings (see, for example, Patent Document 2).

These power transmission belts are each formed with a rocking edge on one side of the element, and constructed to have the plurality of elements relatively rockable with respect to the neighboring elements while being in pressing contact with the driven pulley in the axial direction of the endless band-like rings in the state that the elements are in contact with the elements each led by the rocking edge in the section in which the power transmission belt is being wound around the driven pulley.

PRIOR ART DOCUMENTS

Patent Documents

Patent Document 1: Japanese Patent Publication No. 2008-051322
Patent Document 2: WO01/078919

SUMMARY OF INVENTION

Problems to be Solved

However, the conventional power transmission belt and the method of producing the same as previously mentioned are advantageous in that, if the engagement portions of the neighboring elements are arranged at the inner side of the power transmission belt from the rocking edge portion, the multiplicity of elements can be easily aligned with one another and can be facilitated to be assembled with one another. However, they are disadvantageous in that the work precision of the element is decreased and the life expectancy of the press working mold becomes short, thereby causing such a problem that the power transmission belt becomes high in production cost.

More concretely, the element is produced by usually imparting a fine blanking work and other precise press forming works equivalent to the fine blanking work to the band-like sheet-metal material, thereby punching the sheet-metal material into the profile shape of the element preliminarily set as well as precisely forming the parts of three dimensional shape such as the rocking edge portion and the concave-convex portion. The rocking edge is formed between the flat surface of the outer end side portion of the element positioned at the outer side of the power transmission belt and the inclination surface inclined by partly crushing the inner end side portion of the element positioned at the inner side of the power transmission belt from the rocking edge.

On the other hand, in the case that the engagement portion for engaging the neighboring two elements in concave-convex engagement is arranged inwardly of the rocking edge, the sheet-metal material is pressed and plastically deformed between the punch and the counter punch to form concave and convex portions to be engageable with each other, for example, a circular concave portion on the one side surface of the element and a circular convex portion on the other side surface of the element as well as to form the previously mentioned inclination surface. In this case, it is required that the sheet-metal material be reliably pressed and held between the punch and the counter punch to increase isotropic pressing forces which are so called hydrostatic stresses in the vicinity of the shearing edge of the punching tool used for the work of the concave and convex portions in the vicinity of the concave and convex forming the engagement portion. However, it is difficult to reliably press and hold the sheet-metal material between the punch and the counter punch, resulting from the concave and convex portions and the inclination surface arranged adjacent to each other, thereby causing the work precision of the element to be decreased and shortening the life expectancy of the mold used for the press work.

It is therefore an object of the present invention to provide a low cost power transmission belt and a method of producing the same which enable the material to be reliably pressed and held in the working step of the element, thereby making it possible to prevent the decreased work precision of the element and the lower life expectancy of the press working mold.

Means for Solving Problems

A power transmission belt according to the present invention, for attaining the previous object, comprises an endless band-like ring, and a plurality of elements banded in an annular shape through the endless band-like ring, each of the elements having both end surface portions to be in pressing contact with a pair of pulleys at its both sides in a belt width direction, a rocking edge portion serving as a fulcrum when rocked in the state that the elements are wound around the pulleys, and a concave-convex portion engageable in concave-convex engagement with the concave-convex portions of a pair of neighboring elements, in which each of the elements has a curved inclination surface formed between the rocking edge portion and the concave-convex portion to have an inclination angle reduced toward the concave-convex portion.

By the construction previously defined, the material of the element can be pressed and held on the both surfaces thereof in a wide area in the vicinity of the concave-convex portion to perform the precise forming to the concave-convex portion with excellent precision and the life expectancy of the press working mold can be extended even if the concave-convex portion and the rocking edge portion are positioned adjacent to each other.

In the power transmission belt thus constructed, it is preferable that the curved inclination surface have a radius of curvature larger than a step portion formed in the plate thickness direction of the element between the rocking edge portion and the concave-convex portion.

By the construction previously defined, the possible areas of reliably pressing and holding the material in the neighborhood of the concave-convex portion can widely be secured on the one side surface of the material to be formed with the curved inclination surface. In addition, the stress concentration in the vicinity of the step portion of the element against the pressing force and other forces acted on the power transmission belt from the pulleys in the width direction of the power transmission belt can be effectively suppressed.

Alternatively, a power transmission belt according to the present invention, for attaining the previous object, comprises an endless band-like ring, and a plurality of elements stacked in its plate thickness direction along the endless band-like ring and assembled with the endless band-like ring to be rockable in the plate thickness direction, each of the elements having a rocking edge portion engageable with one side element among a pair of neighboring elements, a concave-convex portion engageable in concave-convex engagement with the concave-convex portions of the pair of neighboring elements, and both end surface portions to be in pressing contact with a pair of pulleys at its both sides in a belt width direction, each of the elements having a first plate thickness portion formed with the rocking edge portion, a second plate thickness portion formed with the concave-convex portion and smaller in plate thickness than the first plate thickness portion, and a step portion having a step formed on one of the surfaces of the element between the first plate thickness portion and the second plate thickness portion, in which the first plate thickness portion is formed with a gentle inclination surface inclined to have the plate thickness of the first plate thickness portion reduced toward the concave-convex portion from the rocking edge portion, the step portion is formed at least at a part in the belt width direction with a curved inclination surface inclined at a maximum inclination angle larger than that of the gentle inclination surface at the one end portion of the step portion adjacent to the gentle inclination surface and having an inclination angle reduced toward the second plate thickness portion, and the curved inclination surface is continuously extending on the surface of the second plate thickness portion at the other end portion of the step portion adjacent to the concave-convex portion.

By the construction previously defined, the material of the element can be pressed and held on the both surfaces thereof in the areas parallel to each other in the vicinity of the concave-convex portion to perform the precise forming to the concave-convex portion with excellent precision and the life expectancy of the press working mold can be extended even if the concave-convex portion and the rocking edge portion are positioned adjacent to each other.

In the power transmission belt thus constructed, it is preferable that the curved inclination surface have a radius of curvature larger than the difference in plate thickness between the first plate thickness portion and the second plate thickness portion.

By the construction previously defined, the possible areas of reliably pressing and holding the material of the element in the neighborhood of the concave-convex portion can widely be secured on the one side surface of the material to be formed with the curved inclination surface. In addition, the stress concentration in the vicinity of the step portion of the element against the pressing force and other forces acted on the power transmission belt from the pulleys in the width direction of the power transmission belt can be effectively suppressed.

In the power transmission belt thus constructed, it is preferable that the first plate thickness portion of the element be positioned at the outer circumferential side of the endless band-like ring, and the second plate thickness portion of the element be positioned at the inner circumferential side of the endless band-like ring.

By the construction previously defined, the multiplicity of elements can be easily assembled with the endless band-like ring, and the postures of the plurality of elements can be stabilized in the section where the power transmission belt is partly wound around the primary pulley and the secondary pulley.

In the power transmission belt thus constructed, it is preferable that the first plate thickness portion of the element have a concave portion for receiving part of the endless band-like ring in opposite relationship with the concave-convex portion across the rocking edge portion.

By the construction previously defined, the posture stabilization of the elements can be achieved by the concave-convex engagements of the concave-convex portions of the neighboring elements at the inner sides of the endless band-like rings, viz., in the second plate thickness portion, and many elements can be easily assembled with the endless band-like rings in the first plate thickness portion relatively wide in the width direction of the power transmission belt compared with the second plate thickness portion.

In the power transmission belt thus constructed, it is preferable that the first plate thickness portion of the element have the concave portion outwardly of the rocking edge portion at the outer circumferential side of the endless band-like ring and at the central portion of the element in the belt width direction.

By the construction previously defined, the multiplicity of elements can be easily assembled with the endless band-like ring, and the both side end surface portions of the element pressed by the pulleys can be set in a wide area, thereby making it possible to improve the stabilization in the winding posture of the power transmission belt and the durability of the same.

In the power transmission belt of the present invention, it is preferable that the curved inclination surface be formed in the whole area of the step portion in the belt width direction, and the radius of curvature of the curved inclination surface be 0.4 mm or more.

By the construction previously defined, the curved inclination surface can be preliminarily formed easily on the material of the element by the roll working and others, and additionally, the plastic deformation amount of the material for performing the precise forming of the rocking edge portion and the concave-convex portion can be suppressed, and the life expectancy of the press working mold can be enhanced.

Meanwhile, a power transmission belt production method according to the present invention is, for achieving the previous object, a method of producing a power transmission belt comprising an endless band-like ring, and a plurality of elements stacked in its plate thickness direction along the endless band-like ring and assembled with the endless band-like ring to be rockable in the plate thickness direction, each of the elements having a rocking edge portion engageable with one side element among a pair of neighboring elements, a concave-convex portion engageable in concave-convex engagement with the concave-convex portions of the pair of neighboring elements, the method includes a material forming step of partially flatly crushing a material of the element to form a first plate thickness portion, a second plate thickness portion smaller in plate thickness than the first plate thickness portion, and a step portion having a step formed on one side surface of the element between the first plate thickness portion and the second plate thickness portion, and a press forming step of punching the element from the material of the element, partially flatly crushing the first plate thickness portion to form a gentle inclination surface inclined to have a plate thickness reduced toward the step portion, and the rocking edge portion, and partially plastically deforming the second plate thickness portion to form the concave-convex portion, in which the material forming step includes shaping the step portion formed with a curved inclination surface inclined at a maximum inclination angle larger than that of the gentle inclination surface at the one end portion of the step portion adjacent to the gentle inclination surface and having an inclination angle reduced toward the second plate thickness portion, and the curved inclination surface is continuously extending on the surface of the second plate thickness portion at the other end portion of the step portion adjacent to the concave-convex portion.

By the construction previously defined, the material of the element can be pressed and held on the both surfaces thereof in the areas parallel to each other in the vicinity of the concave-convex portion to perform the precise forming to the concave-convex portion with excellent precision and the life expectancy of the press working mold can be extended even if the concave-convex portion and the rocking edge portion are positioned adjacent to each other.

In the method of producing a power transmission belt thus structured, it is preferable that the press forming step further include forming the concave-convex portion having a convex portion perpendicularly projecting from the one side surface of the second plate thickness portion, and a concave portion being perpendicularly recessed from the other side surface of the second plate thickness portion opposite to the one side surface of the second plate thickness portion, and an annular corner surface formed between the outer circumferential surface of the convex portion and the one side surface of the second plate thickness portion to have a radius of curvature smaller than that of the curved inclination surface, in which the annular corner surface and the curved inclination surface is connected with each other by part of the one side surface of the second plate thickness portion extending in parallel relationship with the other side surface of the second plate thickness portion.

By the construction previously defined, the material of the element in the vicinity of the convex portion can reliably be pressed in the perpendicular direction to the plate surface of the material even if the convex portion of the concave-convex portion has the annular corner surface at the base end side of the convex portion.

In the method of producing a power transmission belt thus structured, it is preferable that the curved inclination surface be formed to have a radius of curvature larger than the difference in plate thickness between the first plate thickness portion and the second plate thickness portion in the material forming step.

By the construction previously defined, the radii of curvatures of the corner surfaces of the forming roll or press working mold for working the curved inclination surfaces can be increased in dimension, thereby making it possible to enhance the durability of the forming roll or press working mold and to improve the durability of the forming roll or press working mold resulting from the plastic deformation amount of the material reduced at the time of the precise press forming.

In the method of producing a power transmission belt thus structured, it is preferable that the material forming step further include preparing a steel plate preformed in a band-like shape as the material of the element, and roll working the material of the element to form the first plate thickness portion, the second plate thickness portion, and the step portion, and to form the curved inclination surface extending in the longitudinal direction of the material of the element.

By the construction previously defined, it is possible to form the step portion and the curved inclination surface extending in the whole areas of the element in the width direction of the power transmission belt by the roll working, so that the plastic deformation amount of the material at the time of the press working for performing the precise forming of the rocking edge portion and the concave-convex portion can be suppressed, and the work precision of the element and the durability of the press working mold can be enhanced.

Effects of Invention

The power transmission belt according to the present invention allows the material of the element to be pressed and held on the both surfaces thereof in the area parallel to each other in the vicinity of the concave-convex portion to perform the precise forming to the concave-convex portion with excellent precision and the life expectancy of the press working mold to be extended even if the concave-convex portion and the rocking edge portion are close together. Therefore, the power transmission belt according to the present invention can reduce the production cost of the element, and thus can be produced at a low cost while maintaining the work precision of the element.

The method of producing a power transmission belt according to the present invention can enhance the work precision of the element and the life expectancy of the press working mold, resulting from the fact that the material forming step is carried out in such a manner that the curved inclination surface is formed in the step portion between the first plate thickness portion and the second plate thickness portion to be inclined having a large maximum inclination angle from the gentle inclination surface and with the inclination angle being reduced toward the second plate thickness portion, and the press forming step is then carried out in such a manner that the pressing and holding area can be secured in the vicinity of the concave-convex portion, while suppressing the plastic deformation amount of the material for forming the rocking edge portion and the concave-convex portion, thereby making it possible to enhance the work precision of the element and the life expectancy of the press working mold. It is therefore possible to materialize the production method, which can suppress the production cost of the element while maintaining the work precision of the element.

BRIEF DESCRIPTION OF DRAWINGS

FIG. 6B is a side view of the plurality of elements forming part of the power transmission belt according to the first embodiment of the present invention, advancing in a curved section while being wound around the drive pulley or the driven pulley;

DESCRIPTION OF EMBODIMENTS

The preferred embodiment of the present invention will be explained hereinafter with reference to the drawings.

First Embodiment

FIGS. 1 to 6B are outlined block construction views showing the power transmission belt and the shape of its elements forming part of the power transmission belt according to the first embodiment of the present invention, and illustrating an example of the present invention applied to the power transmission belt of the belt type continuously variable transmission of an automotive vehicle.

Firstly, the construction of the power transmission belt according to the first embodiment of the present invention will be described hereinafter.

Figure 5:
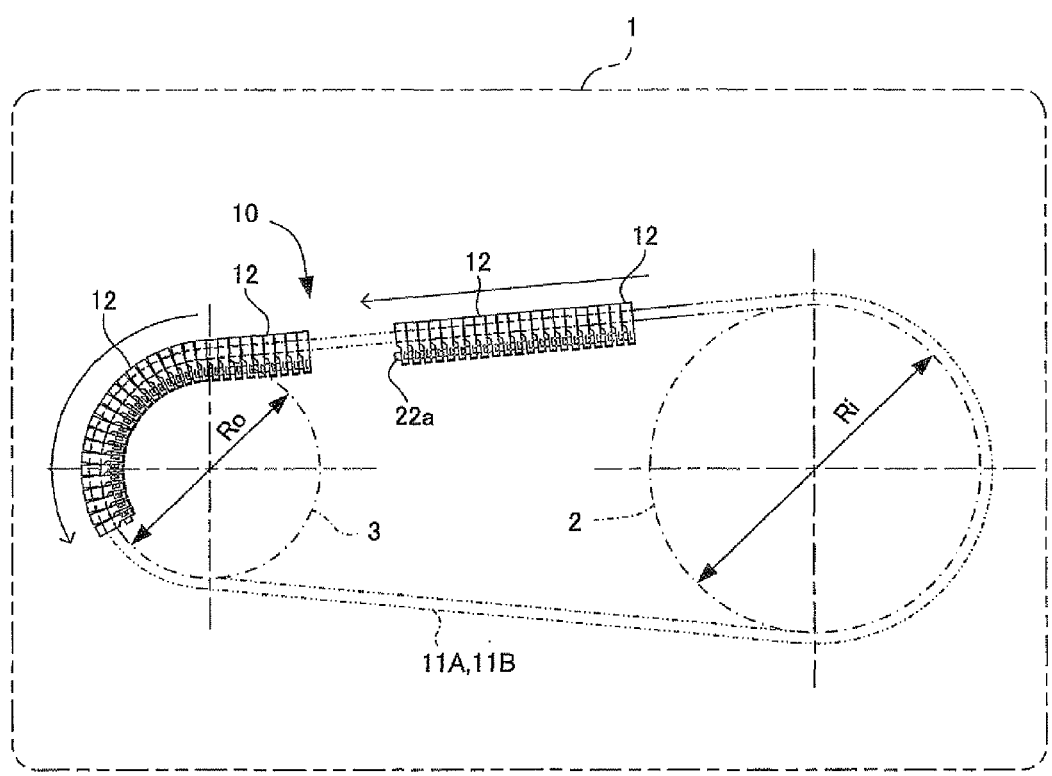
FIG. 5 is a fragmentary side view showing an outlined construction of the power transmission belt according to the first embodiment of the present invention.

As shown in FIG. 5, the power transmission belt 10 according to the present embodiment is made of metal and provided within a continuously variable transmission 1 (its detail not shown). The continuously variable transmission 1 is constructed to include a primary pulley 2 (drive side pulley) drivably connected with an input shaft not shown, a secondary pulley 3 (driven side pulley) drivably connected with an output shaft also not shown, and a power transmission belt 10 partly wound around the both pulleys 2, 3.

The primary pulley 2 (drive side pulley) and the secondary pulley 3 (driven side pulley) are not shown in detail, but are each constructed to have a fixed rotating member and a movable rotating member forming in combination a belt engagement groove having a roughly V-shaped cross section, and a hydraulic actuator for axially moving the movable rotating member with respect to the fixed rotating member so that the width of the belt engagement groove can be varied. Therefore, the fixed member, the movable member, and the hydraulic actuator collectively constitute a variable sheave structure.

More specifically, the primary pulley 2 and the secondary pulley 3 are controlled by a hydraulic control apparatus not shown for operating the hydraulic actuators, respectively. The speed change ratio (Ro/Ri), viz., a ratio of the effective diameter of the secondary pulley 3 (effective diameter Ro of the variable sheave on the output side) to the effective diameter (effective diameter Ri of the variable sheave on the input side) of the primary pulley 2 can be controlled to be continuously varied by the hydraulic control apparatus.

The operating oil pressures to operate the hydraulic actuators of the pulleys 2, 3 are adapted to be controlled by the hydraulic control apparatus to produce adequate pressing forces in the primary pulley 2 and the secondary pulley 3, respectively, to be applied onto the power transmission belt 10 with no slip generated between the power transmission belt 10 and the primary pulley 2 and between the power transmission belt 10 and the secondary pulley 3 to avoid slippage.

Figure 2:
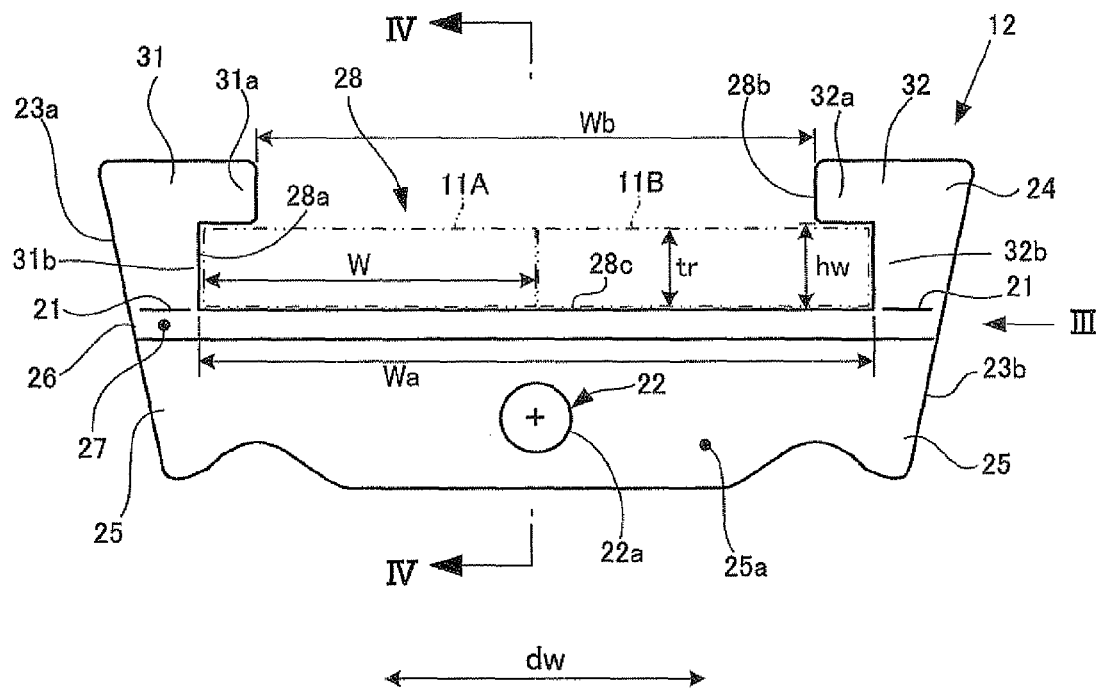
FIG. 2 is a front view of the element forming part of the power transmission belt according to the first embodiment of the present invention.

As shown in FIGS. 2 and 5, the power transmission belt 10 is provided with at least one endless band-like ring, exemplified by two endless band-like rings 11A, 11B arranged in juxtaposed relationship with each other, and a plurality of elements 12 each formed in a plate-like shape and stacked in its thickness direction along the endless band-like rings 11A, 11B to be assembled with the endless bank-like rings 11A, 11B rockably in their thickness direction, so that the elements 12 are banded together in an annular shape through the endless bank-like rings 11A, 11B.

The endless bank-like rings 11A, 11B are each constituted by a plurality of stacked metal rings each for example made of a ribbon-like metal member and respectively having shapes and properties identical to each other.

The plurality of elements 12 are each made of a relatively hard steel plate such as a tool steel plate, and punched into a profile shape as shown in FIG. 2. Each of the elements 12 has a rocking edge portion 21, a concave-convex portion 22, and both end portions 23a, 23b which are formed in precise shapes, respectively. The elements 12 thus precisely shaped are produced by a press working such as a fine blanking and the like capable of conducting a precise compound forming.

Figure 1:
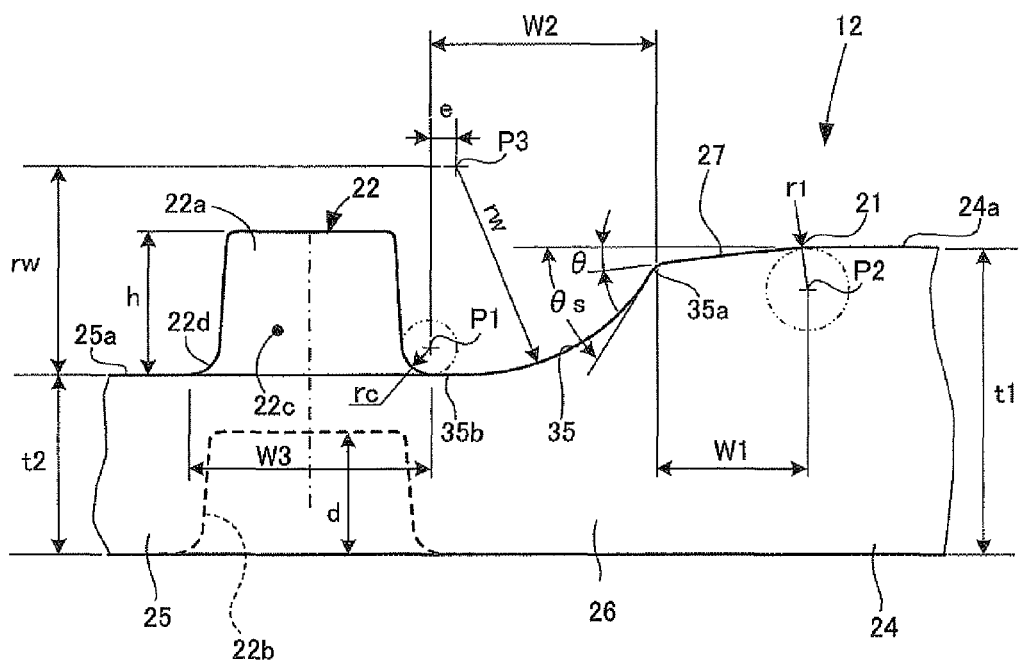
FIG. 1 is an enlarged view of an essential part of an element forming part of a power transmission belt according to a first embodiment of the present invention.
Figure 3:
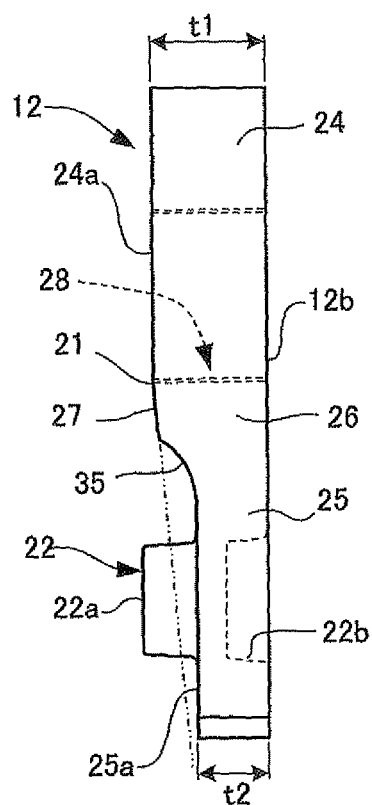
FIG. 3 is a side view seen from an arrow III of FIG. 2.
Figure 4:
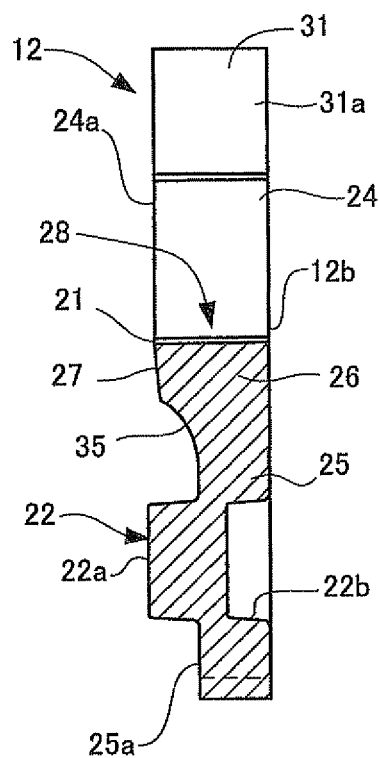
FIG. 4 is a cross sectional view taken along and seen from the lines IV-IV of FIG. 2.

As shown in FIGS. 1, 3 and 4, each of the elements 12 is constituted by a first plate thickness portion 24 formed with the rocking edge portion 21, a second plate thickness portion 25 smaller in plate thickness than the first plate thickness portion 24 and formed with the concave-convex portion 22, and a step portion 26 having a step formed on one side surface of the element 12 between the first plate thickness portion 24 and the second plate thickness portion 25. The first plate thickness portion 24 extends to occupy the outer circumferential side of the power transmission belt 10, while the second plate thickness portion 25 extends to occupy the inner circumferential side of the power transmission belt 10. In other words, the second plate thickness portion 25 extends from the step portion 26 away from the endless bank-like rings 11A, 11B, while the first plate thickness portion 24 extends from the step portion 26 toward the endless bank-like rings 11A, 11B.

The rocking edge portion 21 of the element 12 is formed on the one side surface 24a of the first plate thickness portion 24 into an obtuse angle corner straightly extending in the width direction of the power transmission belt 10. The element 12 has the flat one side surface 24a (one surface) extending to be spaced apart at a predetermined distance from the step portion 26, and a gentle inclination surface 27 inclined at a preliminarily set inclination angle θ with respect to the flat one side surface 24a having a predetermined width and extending in the width direction of the power transmission belt 10. The element 12 has a curved surface formed in a slim band-like shape continuously extending in the width direction of the power transmission belt 10 to have a radius of curvature "r1" previously set between the one side surface 24a and the gentle inclination surface 27 of the first plate thickness portion 24. The rocking edge portion 21 is constituted by the curved surface thus constructed. The rocking edge portion 21 serves as a fulcrum of each of the elements 12 in a curved section in which the power transmission belt 10 is partly wound around the primary pulley 2 or the secondary pulley 3, so that the plurality of elements 12 can be rocked at the rocking edge portion 21 serving as a fulcrum while forming a fan shaped space between the neighboring two elements 12 in the state that the elements 12 are partly wound around the primary pulley 2 or the secondary pulley 3.

More specifically, as shown in FIG. 6B, there are an arbitrary element 12 (hereinafter simply referred to as "element 12A" for convenience), and a pair of elements 12 (hereinafter simply referred to as "elements 12P, 12F" for convenience) arranged at the fore and aft positions of the element 12A, viz., at the leading and trailing positions of the element 12A. The rocking edge portion 21 is adapted to serve as a fulcrum with respect to the fore side element, i.e., the element 12P leading in the rotation direction of the power transmission belt 10 in the whole range in which the effective diameters of the primary pulley 2 and the secondary pulley 3 are variably controlled, viz., in the curved section in which the elements 12 are partly wound around the primary pulley 2 or the secondary pulley 3, so that the elements 12 can be engaged to be rockable with one another.

The gentle inclination surface 27 formed on the first plate thickness portion 24 is gently inclined to make the plate thickness of the element 12 reduced toward the step portion 26 from the rocking edge portion 21. The arbitrary element 12A is in pressing contact with the leading element 12P at the rocking edge portion 21, while the arbitrary element 12A is not in pressing contact with the leading element 12P at the other portion than the rocking edge portion 21 until one of the primary pulley 2 and the secondary pulley 3 has the smallest effective radius or in the curved section that the power transmission belt 10 partly wound around the primary pulley 2 or the secondary pulley 3 has the smallest radius.

Here, the inclination angle of the gentle inclination surface 27 with respect to the one side surface 24a of the first plate thickness portion 24 of the element 12 is represented by the legend "θ". From the effective radius Rmin in the curved section allowing the power transmission belt 10 as shown in FIG. 6B to have the smallest radius and the plate thickness t1 of the first plate thickness portion 24, the inclination angle "θ" is set to be an angle approximate to t1/Rmin (radian) or somewhat larger than that angle.

The concave-convex portion 22 of the element 12 has a convex portion 22a formed in a roughly cylindrical column shape and perpendicularly projecting from the one side surface 25a (one surface) of the second plate thickness portion 25, and a concave portion 22b in a circular shape and perpendicularly recessed from the other side surface, i.e., the back surface 12b of the second plate thickness portion 25. The plurality of elements 12 occupying the fore and aft neighboring positions are adapted to be engageable in concave-convex engagement with each other by the convex portion 22a and the concave portion 22b of the concave-convex portion 22.

Figure 6A:
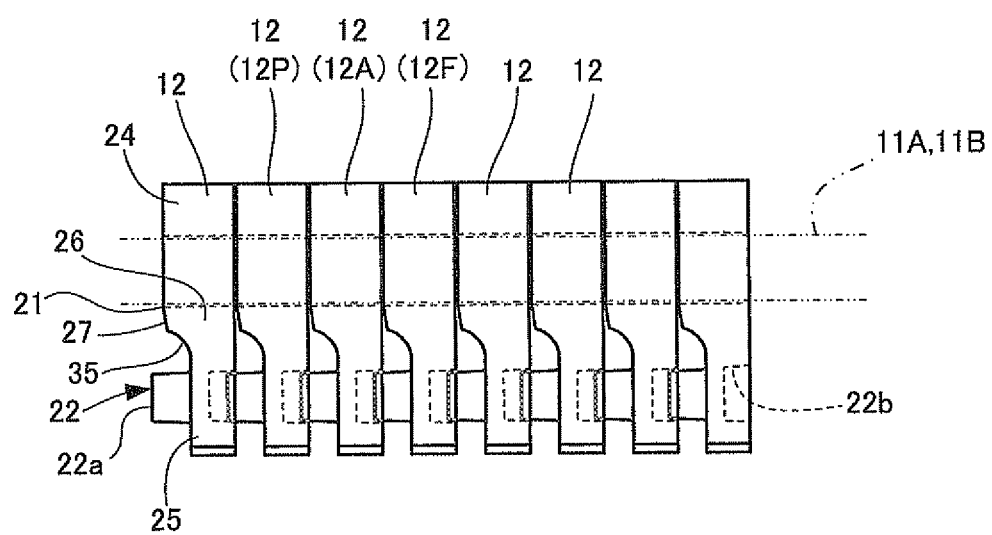
FIG. 6A is a side view of a plurality of elements forming part of the power transmission belt according to the first embodiment of the present invention, advancing in nearly a straight line between a drive pulley and a driven pulley.

As shown in FIGS. 6A and 6B, the convex portion 22a of the arbitrary element 12A is engaged with the concave portion 22b of the element 12P, viz., the leading one side (one surface side) element 12P in the pair of elements 12P, 12F adjacent to the fore and aft sides (both surface sides) of the element 12A, while the concave portion 22b of the arbitrary element 12A is engaged with the convex portion 22a of the element 12F, viz., the trailing other side (the other surface side) element 12F.

The projection height "h" of the convex portion 22a projecting from the one side surface 25a of the second plate thickness portion 25 of the element 12 is almost equal to the recess depth "d" of the concave portion 22b recessed from the back surface 12b of the element 12. The diameter of the convex portion 22a is somewhat smaller than the inner diameter of the concave portion 22b.

The convex portion 22a of the element 12A has an outer circumferential surface taper angle set in response to the inclination angle θ of the inclination surface 27, and the diameter of the base end portion of the convex portion 22a is larger than the diameter of the top end portion of the convex portion 22a. Similarly, the concave portion 22b of the element 12A has an inner circumferential surface taper angle set in response to the inclination angle θ of the inclination surface 27, and the inner diameter of the opening portion of the convex portion 22a is larger than the inner diameter of the bottom end portion of the concave portion 22b.

As shown in FIG. 1, the convex portion 22a is enlarged in diameter in a flaring shape at the base end outer circumferential portion. The outer circumferential surface 22c of the convex portion 22a and the one side surface 25a of the second plate thickness portion 25 are continuously connected with each other by an annular corner surface 22d having a radius of curvature "rc" smaller than the projection height "h" of the convex portion 22a.

The both side end surface portions 23a, 23b of the element 12 are in pressing contact with the fixed rotation member and the movable rotation member in the width direction (hereinafter simply referred to as the belt width direction) indicated by an arrow "dw" shown in FIG. 2 in two curved sections of the power transmission belt 10 partly wound around the primary pulley 2 and the secondary pulley 3. The fixed rotation member and the movable rotation member forming part of each of the primary pulley 2 and the secondary pulley 3 are combined to form a belt engagement groove at the both sides of the power transmission belt 10.

The first plate thickness portion 24 of the element 12 has a concave portion 28 formed therein to receive part of the endless band-like rings 11A, 11B in opposite relationship with the concave-convex portion 22 across the rocking edge portion 21, and has a pair of hook portions 31, 32 arranged in spaced and opposing relationship with each other to form the both inner side walls of the concave portion 28.

The concave portion 28 of the element 12 is positioned at the widthwise central portion of the element 12 in the first plate thickness portion 24 that is positioned on the outer circumferential side of the endless band-like rings 11A, 11B from the rocking edge portion 21.

The pair of hook portions 31, 32 is respectively positioned at the both shoulder portions of the element 12 to form the upper half portions of the both side end surface portions 23a, 23b of the element 12 at the both side end surface portions 23a, 23b of the element 12. The hook portions 31, 32 have respective inner projection portions 31a, 32a for regulating from the upper both end sides of the concave portion 28 the movements of the endless band-like rings 11A, 11B received in juxtaposed relationship with each other in the concave portion 28. The hook portions 31, 32 form both inner wall surfaces of a belt accommodating space portion 28a of the concave portion 28, and an opening portion 28b smaller in inner width than the belt accommodating space portion 28a at the inner projection portions 31a, 32a opposing to each other. Here, the "upper half portion" and "upper" are intended to mean the outer circumferential side of the power transmission belt 10.

More concretely, the belt accommodating space portion 28a of the concave portion 28 has an inner width Wa somewhat larger than the total width W·2 of the endless band-like rings 11A, 11B arranged in juxtaposed relationship with each other, while the inner width Wb of the opening portion 28b is smaller than the inner width Wa of the belt accommodating space portion 28a, and larger than the width W of the endless band-like ring 11A, or 11B (Wa>Wb>W). Further, the belt accommodating space portion 28a of the concave portion 28 has a height "hw" set at a value somewhat larger than the thickness "tr" of the endless band-like rings 11A, 11B.

On the other hand, the step portion 26 of the element 12 is formed at least at a part in the belt width direction, for example, at the whole area (all parts) in the width direction of the step portion 26, with a curved inclination surface 35 inclined at a maximum inclination angle θs larger than the inclination angle θ of the gentle inclination surface 27 at the one end portion 35a of the step portion 26 adjacent to the gentle inclination surface 27 and having an inclination angle reduced toward the second plate thickness portion 25, the curved inclination surface 35 being continuously connected with the one side surface 25a of the second plate thickness portion 25 at the other end portion 35b of the step portion 26 adjacent to the convex portion 22a of the concave-convex portion 22.

The curved inclination surface 35 has a radius of curvature larger than a step formed in the plate thickness direction of the element 12 in the step portion 26, for example, a radius of curvature "rw" larger than the difference (t1−t2) between the plate thickness t1 of the first plate thickness portion 24 and the plate thickness t2 of the second plate thickness portion 25, and thus has a roughly arcuate cross section. The radius of curvature "rw" is set to have a dimension larger than one third of the plate thickness t2 of the second plate thickness portion 25. Here, the plate thickness t2 of the second plate thickness portion 25 is larger than the difference (t1−t2) between the plate thickness t1 of the first plate thickness portion 24 and the plate thickness t2 of the second plate thickness portion 25. The difference (t1−t2) is less than one fourth of the plate thickness t1 of the first plate thickness portion 24, for example, approximately one fifth of the plate thickness t1 of the first plate thickness portion 24. More specifically, when it is assumed that the plate thickness t1 of the first plate thickness portion 24 is 1.5 mm, while the plate thickness t2 of the second plate thickness portion 25 is 1.2 mm, the radius of curvature "rw" of the curved inclination surface 35 is more than 0.4 mm. According to the present invention, the curved inclination surface 35 is not necessarily in an arcuate cross section defined to have a fixed radius of curvature, but may include a curved inclination cross section increased in radius of curvature toward the concave-convex portion 22.

The area allowing the curved inclination surface 35 to be formed in the height direction (left and right directions in FIG. 1; hereinafter simply referred to as "element height" direction) of the element 12 is in the range from the center P1 of the radius of curvature "rc" of the annular corner surface 22d of the convex portion 22a to the surface curvature center P2 of the rocking edge 21 (W1+W2 in FIG. 1), but specified by the width W2 in the range excluding the height equivalent to the width W1 forming the gentle inclination surface 27 to be required for precisely forming the rocking edge portion 21.

The position of the center P3 of the radius of curvature "rw" of the curved inclination surface 35 is positioned at an upper side from the one side surface 25a of the second plate thickness portion 25 by the radius of curvature "rw" as shown in FIG. 1. While the width W1 of the gentle inclination surface 27 to be required for precisely forming the rocking edge portion 21, and the width W3 between the annular corner surfaces 22d of the concave-convex portion 22 are secured, the curved inclination surface 35 is formed to continuously connect the one side surface 25a of the second plate thickness portion 25 and the gentle inclination surface 27 in the range of the width W2 between the widths W1 and W3. The radius of curvature "rw" of the curved inclination surface 35 is set at a value larger than the length (W2−e) deducting from the width W2 the distance "e" (≧0) in the element height direction from the center P1 of the radius of curvature "rc" of the annular corner surface 22d of the convex portion 22a to the center P3 of the radius of curvature "rw" of the curved inclination surface 35. The maximum inclination angle θs of the curved inclination surface 35 is set at a value less than 90 degrees, preferably (90°−θ) to make the connecting angle of the curved inclination surface 35 and the gentle inclination angle 27 an obtuse angle.

Each of the elements 12 is produced by a press working such as a fine blanking and the like to have a blanked surface in the whole area of a profile shape portion of the front face shown in FIG. 2. The whole area of the profile shape portion has a shear plane ratio in a degree of nearly a complete shear. The surface of the inner bottom surface portion 28c of the concave portion 28 near the rocking edge portion 21 has a marginal amount of rollover (shear drop) in the same degree as the outer circumferential portion of the element 12.

Next, the production method of the power transmission belt 10 according to the present embodiment will be described hereinafter.

As described before, the power transmission belt 10 comprises the endless band-like rings 11A, 11B arranged in juxtaposed relationship with each other, a plurality of elements 12 stacked in the thickness direction t1, t2 along the endless band-like rings 11A, 11B and assembled with the endless band-like rings 11A, 11B to be rockable in the thickness direction t1, t2. When the rocking edge portion 21 to be rockably engaged with the one side element 12P in the pair of elements 12P, 12F neighboring with each other, and the concave-convex portion 22 to be engaged in concave-convex engagement with the neighboring pair of the elements 12P, 12F are precisely formed, a material forming step is firstly executed, and then a press forming step is executed. The material forming step is of forming a band-like material 20 made of steel and the like to have a predetermined cross sectional shape, while the press forming step is capable of precise compound forming such as a fine blanking and the like.

Firstly, as the material 20 of the element 12 is prepared a steel plate preliminarily formed in a band-like shape and having the plate thickness t1. This material 20 is made, for example, with a tool steel plate having a width of the band nearly double the dimension of the element 12 in the height direction of the element 12.

In the material forming step, the material 20 of the element 12 is subjected to roll working to form a material portion corresponding to the first plate thickness portion 24, the second plate thickness portion 25, and the step portion 26, as well as forming a curved inclination surface 35m corresponding to the step portion 26 and extending in the longitudinal direction of the material 20.

Figure 7A:
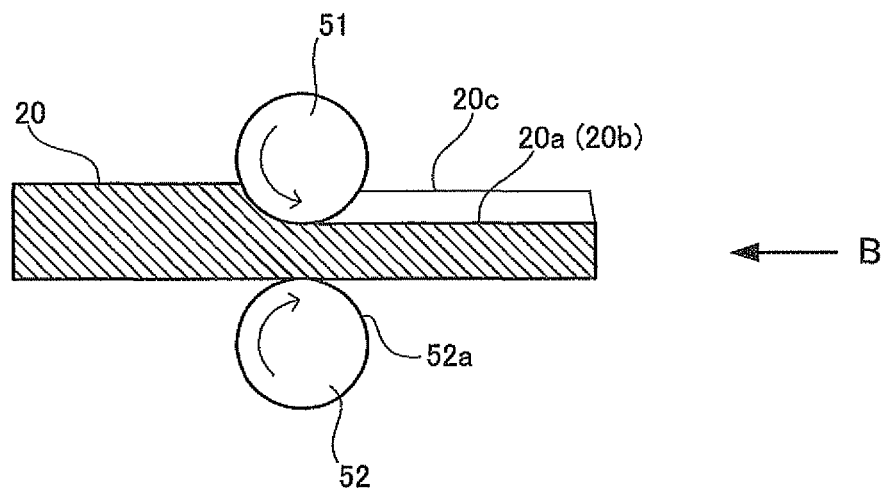
FIG. 7A is an explanation view for explaining a material forming step of roll forming a band-like material for producing the elements forming part of the power transmission belt according to the first embodiment of the present invention.
Figure 7B:
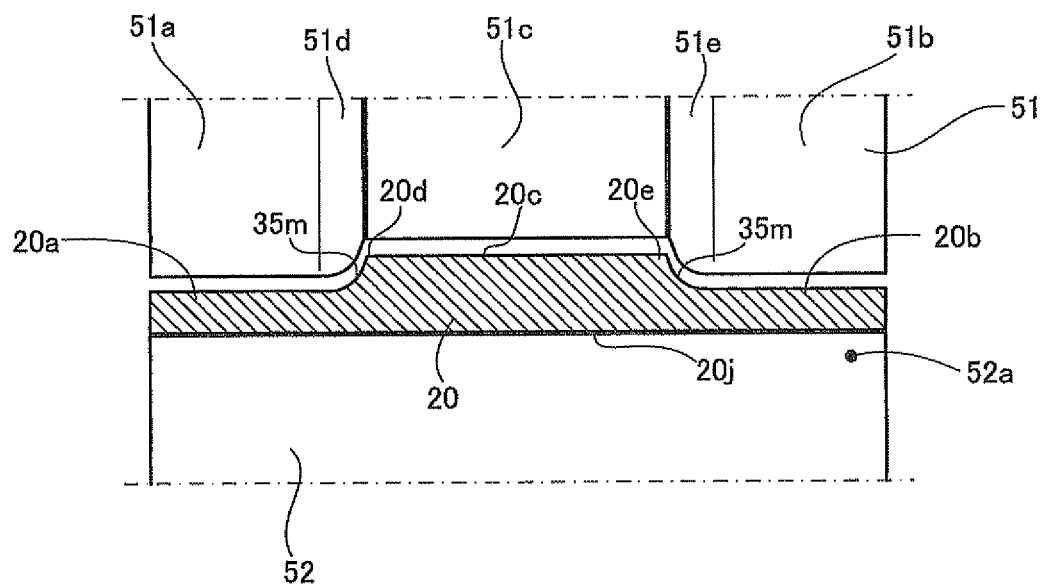
FIG. 7B is a side view seen from an arrow B of FIG. 7A.

More specifically, the material forming step is shown in FIGS. 7A and 7B to have the material 20 of the element 12 partially flatly crushed (plastically deformed by the press working) between upper and lower forming rolls 51, 52 as particularly shown in FIG. 7A. The material 20 is being roll worked while passing through the forming rolls 51, 52 to be formed with the thick plate material portion 20c prior to the press working corresponding to the first plate thickness portion 24 of the plate thickness t1, the thin material portions 20a, 20b prior to the press working corresponding to the second plate thickness portion 25 of the plate thickness t2, and step portions 20d, 20e in a band-like shape having respective steps corresponding to the step portions 26 between the thick plate material portion 20c and the thin plate material portions 20a, 20b.

Here, the thin plate material portions 20a, 20b are formed at the both end portions in the width direction of the material 20 from the material 20 having a fixed length to make it possible to produce a pair of elements 12 having the first plate thickness portion 24 at the central portion in the width direction of the material 20 and the second plate thickness portions 25 at both end portions in the width direction of the material 20.

FIG. 7B shows half cylindrical portions forming part of the upper and lower forming rolls 51, 52 extending toward the material 20 from the center axes of the upper and lower forming rolls 51, 52, the upper forming roll 51 being shown as being spaced apart from the material 20 for better understanding. The upper roll 51 has a pair of large diameter portions 51a, 51b for respectively forming the thin plate material portions 20a, 20b having respective plate thicknesses corresponding to the second plate thickness portions 25 at the both end portions in the width direction of the material 20, and a small diameter portion 51c between the large diameter portions 51a, 51b to make flat the thick plate material portion 20c. The end portions of the large diameter portions 51a, 51b adjacent to the small diameter portion 51c are formed with a pair of annular curved surfaces 51d, 51e for forming portions corresponding to the step portions 26, respectively, by transcribing the curves to the curved inclination surfaces 35m corresponding to the curved inclination surfaces 35.

The lower forming roll 52 is shown in FIG. 7B to have a roughly cylindrical surface 52a to be held in contact with the back surface 20j of the material 20. The lower forming roll 52 serves to support the material 20 from the back surface 20j against the pressure applied from the upper forming roll 51, and can move the material 20 in cooperation with the upper forming roll 51 at a predetermined set transportation speed toward the downstream side (right side in FIG. 7A).

Figure 8A:
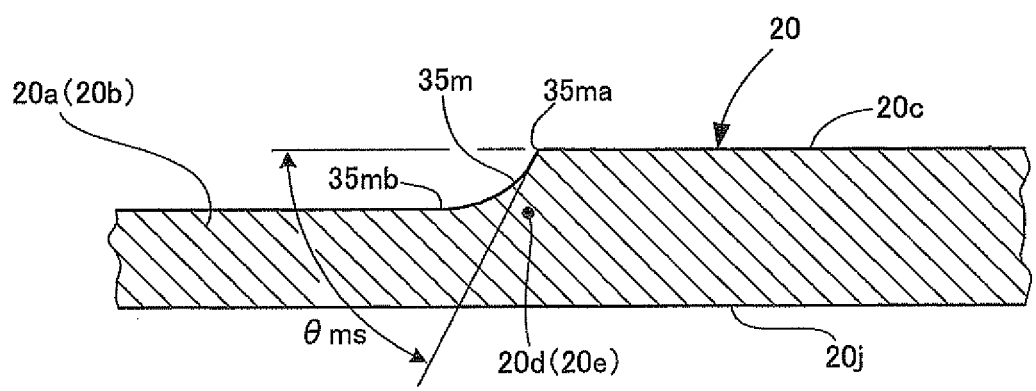
FIG. 8A is a cross sectional view of an essential part of the material formed in the material forming step for producing the elements forming part of the power transmission belt according to the first embodiment of the present invention.

As shown in FIG. 8A, the material forming step is carried out in such a manner that the curved inclination surfaces 35m are formed at the band-like step portions 20d, 20e corresponding to the step portions 26 of the material 20, the curved inclination surfaces 35m being formed to be inclined having a maximum inclination angle θms at the one end side 35ma neighboring to the thick plate material portion 20c and an inclination angle reduced toward the thin plate material portions 20a, 20b. Further, the curved inclination surfaces 35m are formed to continue to the one side surface 25a of the second plate thickness portion 25 at the other end side 35mb positioned in the vicinity of the concave-convex portion 22. Here, the maximum inclination angle θms is an inclination angle larger than that of the gentle inclination surface 27 after the press working hereinafter described and is an angle approximate to the maximum inclination angle θs of the curved inclination surface 35.

In the next press forming step, every press working operation is carried out in such a way that the band-like materials 20 are concurrently press worked to punch the profile shape portions of the plurality of elements 12 from the band-like materials 20. During the time from the punch work start to the punch work finish, a pair of gentle inclination surfaces 27 and a pair of rocking edge portions 21 are formed. More specifically, the inclination surfaces 27 are formed by partly pressing and crushing the both side edge portions of the thick plate material portion 20c corresponding to the first plate thickness portion 24 from the one surface side of the material 20 to be inclined to be gradually reduced in plate thickness from the plate thickness t1 toward the step portion 26. The rocking edge portions 21 are formed to have the gentle inclination surface 27 and the flat one side surface 24a corresponding to the first plate thickness portion 24 connected with each other with the radius of curvature "r1". Simultaneously with this operation, the thin plate material portions 20a, 20b corresponding to at least a pair of second plate thickness portion 25 are partly plastically deformed to form at least a pair of concave-convex portions 22.

Figure 8B:
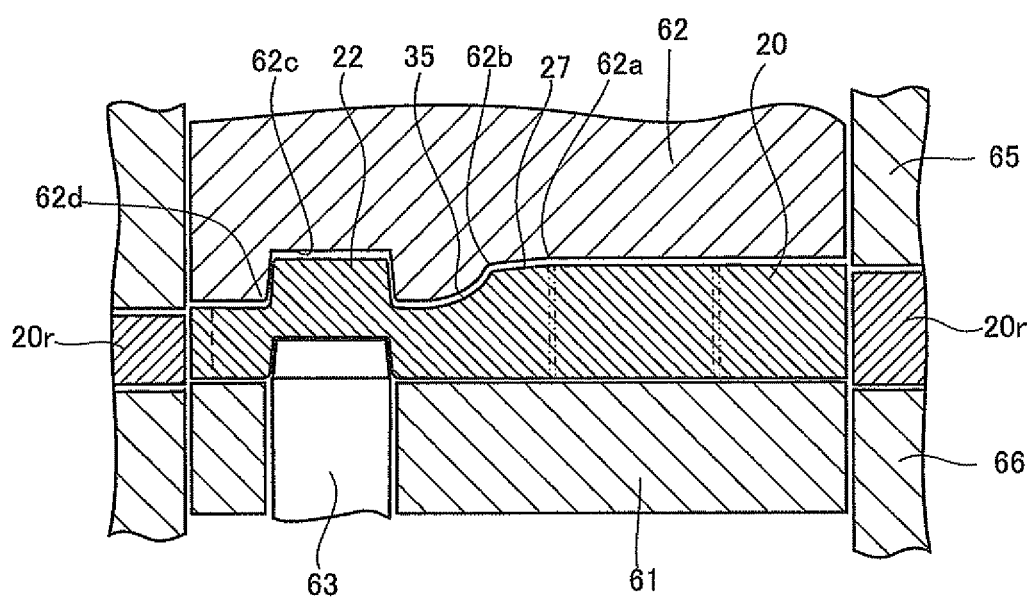
FIG. 8B is an explanation view for explaining a press forming step for producing the elements forming part of the power transmission belt according to the first embodiment of the present invention.

In the above press forming step, the plurality of elements 12 are concurrently press worked as shown in FIG. 8B. For example, for each element 12 being press worked, one combination of a punch 61 and a counter punch 62 having a shape corresponding to the profile shape portion of the element 12, and a movable projection pin 63 corresponding to the concave-convex portion 22 are employed. The profile shape portions of the elements 12 are punched to be in a near complete shear from the material 20 in such a manner that the material 20 is partly pressed between the punch 61 and the counter punch 62, and the punch 61 and the counter punch 62 are then moved upwardly in FIG. 8B with respect to the die plate 65 and the stinger plate 66 clamping and constraining the remaining portions 20r of the material 20 with the projections and the like, so that the element 12 can be punched from the remaining portions 20r of the material 20 constrained by the die plate 65 and the stinger plate 66.

Figure 8C:
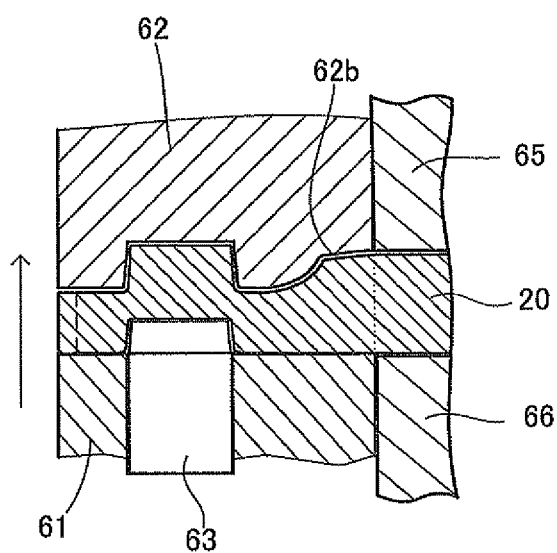
FIG. 8C is a cross sectional side view of the element showing a forming shape in the press forming step shown in FIG. 8B.
Figure 8D:
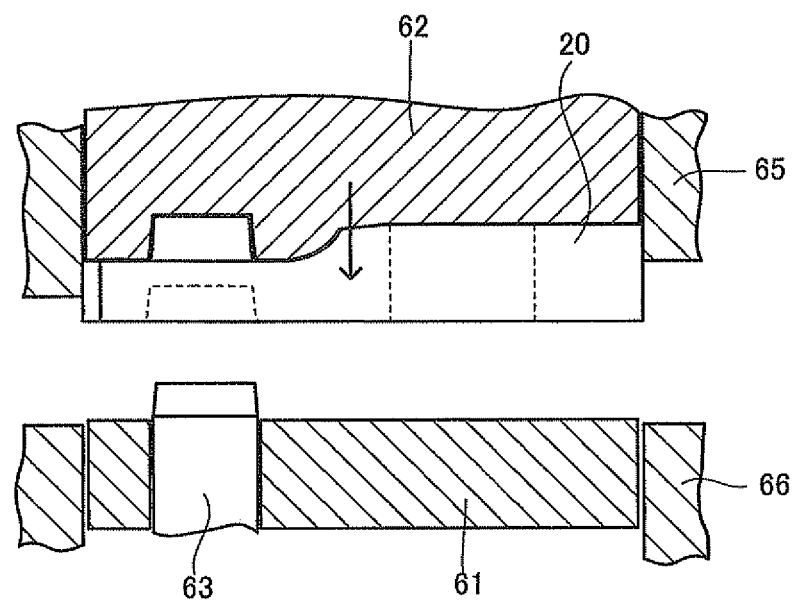
FIG. 8D is an explanation view for explaining a step of removing from the material the element press formed in the forming shape shown in FIG. 8C.

After the pressing force of the punch 61 and the counter punch 62 pressing and holding the material 20 is decreased, the punch 61 is released and retracted away from the material 20 and the counter punch 62 punched toward the die plate 65. Then, the pressing force of the material 20 between the die plate 65 and the stinger plate 66 is decreased to open the die plate 65 and the stinger plate 66 and to transport the material 20 to the following step. At the same time, as shown in FIG. 8D, the counter punch 62 is moved toward the punch 61 and returned to its initial position from the position at the time of completion of the punch. The material 20 punched toward the die plate 65 together with the counter punch 62 is then discharged from the opening of the die plate 65.

The counter punch 62 is shown in FIG. 8B to be formed with a shape transcription portion 62a, a shape transcription portion 62b, a cylindrical concave portion 62c, and an annular shape transcription portion 62d. The shape transcription portion 62a is designed to form the rocking edge portion 21 at the base portions of the pair of hook portions 31, 32 constituting in combination part of the first plate thickness portion 24 of the element 12, while the shape transcription portion 62b is designed to form the gentle inclination surface 27. The cylindrical concave portion 62c is designed to form the convex portion 22a of the concave-convex portion 22, while the annular shape transcription portion 62d is positioned at the entrance portion of the cylindrical concave portion 62c. Here, the annular shape transcription portion 62d functions to transcribe the annular corner surface 22d at the base end outer circumference of the convex portion 22a. In FIGS. 8B to 8D, for better discriminating the crushing portions and the portions to be worked by the press working mold, the punch 61, the counter punch 62, and the material 20 disposed between the punch 61 and the counter punch 62 are shown to have gaps formed therebetween, and the die plate 65, the stinger plate 66, and the remaining portion 20r of the material 20 disposed between the die plate 65 and the stinger plate 66 are also shown to have gaps formed therebetween. However, of course, the punch 61, the counter punch 62, and the material 20 are in pressing contact with each other, and the die plate 65, the stinger plate 66, and the remaining portion 20r of the material 20 are also in pressing contact with each other. Furthermore, the outer portions of the punch 61 and the counter punch 62, and the die plate 65 and the stinger plate 66 are shown to have gaps formed therebetween. However, these gaps are, of course, extremely small sliding clearances for the fine blanking and the like.

In FIG. 8B, for showing the working portion of the rocking edge portion 21 and the working portion of the concave-convex portion 22 together, the concave-convex portion 22 and the hook portion 31 to be sheared are shown in built-up section, while the profile shape portion to form the concave portion 28 is not shown but by phantom lines. As shown in FIG. 8C, the portion to form the concave portion 28 is sheared into the profile shape portion corresponding to the concave portion 28 by the punch 61 and the counter punch 62 approaching each other to narrow the gap therebetween. Therefore, the edge portion of the step portion 26 in the vicinity of the inner bottom surface portion 28c of the concave portion 28 positioned at almost the same height of the rocking edge portion 21 in the height direction of the element 12 is formed within the range not projecting from the band-like curved surface of the rocking edge portion 21 at the base portion of the hook portions 31 and 32 and thus, for example, formed with a marginal amount of rollover the same in degree as the other outer circumferential profile shape portion of the element 12.

The press forming step is carried out in such a manner that the concave-convex portion 22 is formed to have the front side convex portion 22a perpendicularly projecting from the one side surface 25a of the second plate thickness portion 25, and the rear side concave portion 22b perpendicularly recessed from the other side surface of the second plate thickness portion 25. Between the outer circumferential surface 22c of the front side convex portion 22a and the one side surface 25a of the second plate thickness portion 25 is formed an annular corner surface 22d formed in arcuate cross section and having a radius of curvature smaller than that of the curved inclination surface 35. The annular corner surface 22d and the curved inclination surface 35 are partly connected with each other on the one side surface 25a in parallel with the opposite surface 12b of the second plate thickness portion 25.

The projection pin 63 is projected from the side of the punch 61 to the side of the counter punch 62 in the state of the material 20 partly pressed between and by the punch 61 and the counter punch 62, thereby making it possible to concurrently form the convex portion 22a and the concave portion 22b. The convex portion 22a is formed in a roughly cylindrical shape and perpendicularly projects from the one side surface 25a (one surface) of the second plate thickness portion 25 of the element 12 at the one side surface of the material 20. The concave portion 22b is formed in a circular shape and recessed from the back surface 12b of the element 12, viz., the other side surface of the second plate thickness portion 25 of the element 12. An ejector pin provided in opposing relationship with the projection pin 63 makes it possible to enhance a press working mold release capability of removing the element 12 from the die plate 65 after the punching operation.

On the other hand, the endless band-like rings 11A, 11B are each produced as a stacked metal ring made of a plurality of metal ribbon members stacked on one another.

The plurality of elements 12 punched from the band-like material 20 in the press forming step is then stacked on one another in the plate thickness direction along the endless band-like rings 11A, 11B. The endless band-like rings 11A, 11B are then partly accommodated in the concave portions 28 of the elements 12 to have the elements 12 rockably assembled with endless band-like rings HA, 11B in the thickness direction. When the predetermined number of elements 12 is assembled with the endless band-like rings 11A, 11B, the predetermined number of elements 12 is brought into the state becoming annularly constrained by the endless band-like rings 11A, 11B to produce the power transmission belt 10 as a final product.

Next, the operation of the power transmission belt according to the first embodiment of the present invention will be explained hereinafter.

In the power transmission belt and the production method of the same thus constructed according to the present embodiment is formed the gentle inclination surface 27 and the curved inclination surface 35. The gentle inclination surface 27 is formed in the first plate thickness portion 24 of the element 12 to be inclined and reduced in plate thickness toward the step portion 26 from the rocking edge portion 21. The curved inclination surface 35 is formed in the whole area in the belt width direction of the step portion 26 to be inclined having a maximum inclination angle θs larger than that of the gentle inclination surface 27 at the one end side 35a neighboring to the gentle inclination surface 27, and an inclination angle reduced toward the second plate thickness portion 25, and to be connected to the one side surface 25a of the second plate thickness portion 25 at the other end side 35b positioned in the vicinity of the concave-convex portion 22. The above construction of the element 12 makes it possible to reliably press and hold the both surfaces of the material 20 of the element 12 in the vicinity of the concave-convex portion 22 in the pressing and holding areas having the both surfaces of the material 20 of the element 12 in parallel relationship with each other even if the concave-convex portion 22 and the rocking edge portion 21 are brought into being close to each other, as well as carrying out a precise press forming of the concave-convex portion 22 with an excellent precision, and to bring about an extended and thus extremely long life expectancy to the press working mold.

The curved inclination surface 35 has an arcuate cross section having a radius of curvature "rw" larger than the difference (t1–t2) between the plate thickness t1 of the first plate thickness portion 24 and the plate thickness t2 of the second plate thickness portion 25, so that the possible areas of reliably pressing and holding the material 20 in the neighborhood of the concave-convex portion 22 can widely be secured on the one side surface of the material 20 to be formed with the curved inclination surface 35. In addition, the stress concentration in the vicinity of the step portion 26 of the element 12, especially in the vicinity of the both end portions of the step portion 26 having the pair of the hook portions 31, 32 connected together, against the pressing forces and other forces (caused by the changed contacting postures of the elements with the pulleys) acted on the power transmission belt 10 from the primary pulley 2 and the secondary pulley 3 in the belt width direction can be effectively suppressed.

Further, the first plate thickness portion 24 having a large plate thickness is positioned circumferentially outwardly of the endless band-like rings 11A, 11B, while the second plate thickness portion 25 having a small plate thickness is positioned circumferentially inwardly of the endless band-like rings 11A, 11B, so that the multiplicity of the elements 12 can be easily assembled with the endless band-like rings 11A, 11B, and the postures of the plurality of elements 12 can be stabilized in the section where the power transmission belt 10 is partly wound around the primary pulley 2 and the secondary pulley 3.

In addition, the first plate thickness portion 24 of the element 12 is constructed to have the concave portion 28 positioned in opposite relationship with the concave-convex portion 22 across the rocking edge portion 21 to receive part of the endless band-like rings 11A, 11B, so that the posture stabilizations of the elements 12 can be achieved by the concave-convex engagements of the concave-convex portions 22 of the neighboring elements 12 at the inner sides of the endless band-like rings 11A, 11B, viz., in the second plate thickness portion 25, and the many elements 12 can be easily assembled with the endless band-like rings 11A, 11B in the first plate thickness portion 24 relatively wide in the width direction of the power transmission belt 10 compared with the second plate thickness portion 25.

In particular, the concave portion 28 of the element 12 is positioned at the outer circumferential side of the endless band-like rings 11A, 11B from the rocking edge portion 21 and at the widthwise central portion of the element 12 in the first plate thickness portion 24, so that the many elements 12 can be easily assembled with the endless band-like rings 11A, 11B. Furthermore, the both side end surface portions 23a, 23b of the element 12 pressed by the primary pulley 2 and the secondary pulley 3 can be set in a wide area, thereby making it possible to improve the stabilization in the winding posture of the power transmission belt 10 and the durability of the same.

Additionally, in the present embodiment, the curved inclination surface 35 is formed in the whole area of the step portion 26 in the width direction of the power transmission belt 10, and the radius of curvature "rw" of the curved inclination surface 35 is more than 0.4 mm, so that the curved inclination surface 35m can be preliminarily easily formed on the material 20 by the roll working and the like. In addition, the plastic deformation amount of the material 20 for performing the precise forming of the rocking edge portion 21 and the concave-convex portion 22 can be suppressed and thus, the life expectancy of the press working mold can be enhanced.

Figure 9:
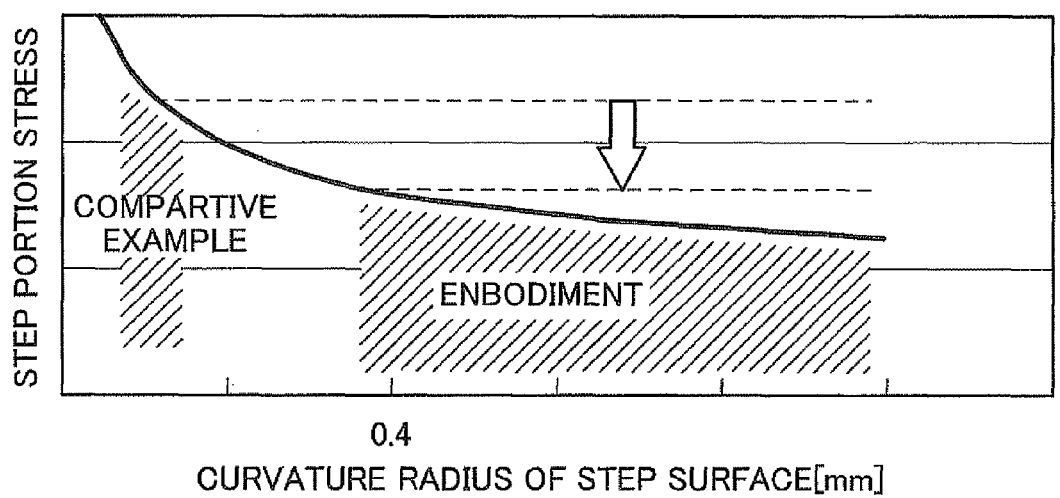
FIG. 9 is a graph showing the relationship between a radius of curvature of a step surface (curved inclination surface) of the element forming part of the power transmission belt according to the first embodiment of the present invention and stresses generated in the step portion when the elements are pressed by the pulleys.

Incidentally, FIG. 9 shows an example of the present embodiment and a comparative example of the element 12 having the previous construction. The example is to use a material 20 made of low-carbon tool steel having a plate thickness of 1.5 mm and formed with the plate thickness t1 of the first plate thickness portion 24 having 1.5 mm, the plate thickness t2 of the second plate thickness portion 25 having 1.2 mm, and the radius of curvature "rw" of the curved inclination surface 35 being more than 0.4 mm. The comparative example is under the condition the same as the previous example except for the radius of curvature (hereinafter called "corner R") of the corner portion of the step portion being reduced in size in place of the curved inclination surface 35 of the step portion 26, the corner R of the step portion being the step height, viz., about a half of 0.3 mm of the difference between the plate thickness t1 of the first plate thickness portion 24 and the plate thickness t2 of the second plate thickness portion 25. The above examples are compared in terms of the stress (hereinafter called "step portion stress") generated in the vicinity of the corner R of the both end portions of the step portion 26 by the pressing forces acted on the hook portions 31, 32.

It will clearly be understood from FIG. 9 that the step portion stress can be drastically reduced and thus can prevent the stress concentration in the example, in which the radius of curvature of the step surface (the curved inclination surface 35 or the surface of the corner R of the step portion) is more than 0.4 mm (one third of the plate thickness t2), as compared with the comparative example.

According to the power transmission belt of the present embodiment previously mentioned, the both surfaces of the material 20 in the vicinity of the concave-convex portion 22 can reliably be pressed and held in the areas thereof parallel to each other to perform the precise press forming to the concave-convex portion 22 with excellent precision even if the concave-convex portion 22 and the rocking edge portion 21 are adjacent to each other in the height direction of the element 12, and the long life expectancy of the press working mold can be achieved. This means that it is possible to provide the power transmission belt 10 which can reduce the production cost of the element 12, and thus can be made inexpensive while maintaining the work precision of the element 12.

On the other hand, in the material forming step of the production method according to the present embodiment, the band-like step portions 20d, 20e respectively corresponding to the step portions 26 are roll worked to form the curved inclination surfaces 35m to be inclined having a maximum inclination angle θms at the one end side 35ma neighboring to the thick plate material portion 20c and an inclination angle reduced toward the thin plate material portions 20a, 20b, the curved inclination surfaces 35m being formed to continue to the one side surface 25a of the second plate thickness portion 25 at the other end side 35mb positioned in the vicinity of the concave-convex portion 22, so that the both surfaces of the material 20 in the vicinity of the concave-convex portion 22 can reliably be pressed and held in the areas thereof parallel to each other to perform the precise press forming to the concave-convex portion 22 with excellent precision even if the concave-convex portion 22 and the rocking edge portion 21 are adjacent to each other in the height direction of the element 12, and the long life expectancy of the press working mold can be achieved.

Further, in the press forming step, the concave-convex portion 22 is formed to have the front side convex portion 22a perpendicularly projecting from the one side surface 25a of the second plate thickness portion 25, and the rear side concave portion 22b perpendicularly recessed from the other side surface of the second plate thickness portion 25. Between the outer circumferential surface 22c of the front side convex portion 22a and the one side surface 25a of the second plate thickness portion 25 is formed an annular corner surface 22d formed in arcuate cross section and having a radius of curvature smaller than that of the curved inclination surface 35. The annular corner surface 22d and the curved inclination surface 35 are partly connected with each other on the one side surface 25a in parallel with the opposite surface 12b of the second plate thickness portion 25. As a consequence, the material 20 in the vicinity of the concave-convex portion 22 can reliably be pressed and held in the perpendicular direction to the plate surface of the material 20 to perform the precise press forming to the concave-convex portion 22 with excellent precision even if the convex portion 22a of the concave-convex portion 22 has the annular corner surface 22d at the base end side of the convex portion 22a.

Further, in the material forming step, the curved inclination surface 35 has an arcuate cross section having the radius of curvature "rw" larger than the difference (t1−t2) between the plate thickness t1 of the first plate thickness portion 24 and the plate thickness t2 of the second plate thickness portion 25, so that the radii of curvatures of the annular curved surfaces 51d, 51e of the forming roll 51 for working the arcuate cross section of the curved inclination surface 35 can be increased in dimension, thereby making it possible to enhance the durability of the forming roll 51 and to improve the durability of the press working mold resulting from the plastic deformation amount of the material 20 reduced at the time of the precise press forming.

Additionally, a tool steel plate preliminarily formed in a band-like shape is prepared as the material 20, and the material forming step is carried out with the material 20 being roll worked to form the thick plate material portion 20e, the thin material portions 20a, 20b, and the step portions 20d, 20e in a band-like shape, respectively corresponding to the first plate thickness portion 24, the second plate thickness portions 25, and the step portions 26, and to form the curved inclination surfaces 35m at the both step portions 20d, 20e, respectively to extend in the longitudinal direction of the material 20, so that the curved inclination surface 35 of the step portion 26 extending in the whole area of the element 12 in the width direction of the power transmission belt 10 can be easily formed by the roll working. Therefore, the plastic deformation amount of the material 20 for performing the precise forming of the rocking edge portion 21 and the concave-convex portion 22 can be suppressed, and the work precision of the element 12 and the life expectancy of the press working mold can be enhanced.

From the foregoing description, it will be understood that the production method of the power transmission belt according to the present embodiment can enhance the work precision of the element and the life expectancy of the press working mold, resulting from the fact that the material forming step is carried out in such a manner that the curved inclination surface 35 is formed in the step portion 26 between the first plate thickness portion 24 and the second plate thickness portion 25 to be inclined having a maximum inclination angle θs larger than that of the gentle inclination surface 27 with the inclination angle being reduced toward the second plate thickness portion 25, and the press forming step is then carried out in such a manner that the pressing and holding area can be secured in the vicinity of the concave-convex portion 22, while suppressing the plastic deformation amount of the material 20 for forming the rocking edge portion 21 and the concave-convex portion 22, thereby making it possible to enhance the work precision of the element 12 and the life expectancy of the press working mold. It is therefore possible to materialize the production method which can suppress the production cost of the element 12 while maintaining the work precision of the element 12.

Although it has been described that the curved inclination surface 35 is formed in the whole area of the step portion 26 in the width direction of the power transmission belt 10, in the power transmission belt 10 and the production method of the same according to the present embodiment as previously mentioned, the curved inclination surface 35 may be formed only at the central portion of the element 12 in the width direction of the power transmission belt 10 in the neighborhood of the rocking edge portion 21 and the concave-convex portion 22. However, it is preferable that the curved inclination surface 35 be formed at the both end portions of the element 12 in the width direction of the power transmission belt 10 because it is required to suppress the concentration of the stress at the both end portions of the element 12 in the width direction of the power transmission belt 10 having the pair of the hook portions 31, 32 and the step portion 26 connected with each other in the case that the force in the bending direction of the element 12 caused by the pressing forces of the pair of hook portions 31, 32 and the like is applied to the element 12, and if it is considered to facilitate the work by the roll forming of the material and to enhance the press working precision after the roll forming of the material.

Though it has been explained in the above embodiment that the element 12 has the hook portions 31, 32 at the both shoulder portions thereof, the element is not limited to being formed in this shape, but may be formed to have a head portion in a roughly T-shape like the profile shape of the element disclosed, for example, in Patent Document 2 in lieu of the hook portions 31, 32 according to the present invention. The T-shape head portion thus disclosed has a protrusion positioned at the central portion of the power transmission belt and extending circumferentially outwardly of and between a pair of band-like rings 11A, 11B.

Further, the production method has been raised as one of the embodiment in the above description to explain about the case that the thin plate material portions 20a, 20b are formed at the both end portions of the materials 20 in the width direction of the power transmission belt 10, and the pair of elements 12 are punched in an every predetermined length of the material 20. However, a single element 12 may be punched or many band-like thin plate portions may be used as material to be roll worked to be able to produce many elements 12 by punching the material each having a predetermined length according to the present invention. Of course, a plurality of punches and counter punches can be arranged in the longitudinal direction (feeding direction) of the material to make it possible to work many elements 12 in only one time punching operation.

The above material forming step has been explained to be performed by the roll work. However, the step may be replaced by another working step of forming the material 20 in an every predetermined length of the material 20 according to the present invention. In this case, the step portions and the curved inclination surfaces may have respective cross sections different from each other in the belt width direction.

The element may be constructed to have a plurality of concave-convex portions. The element may be considered to be constructed to have a second plate thickness portion and a concave-convex portion outwardly of the first plate thickness portion (the outer circumferential end portion of the power transmission belt) and to have a rocking edge portion and a inclination surface for forming the rocking edge portion at the inner side of the first plate thickness portion.

As will be understood from the foregoing description, the power transmission belt according to the present invention can achieve advantageous effect of allowing the both surfaces of the element to be pressed and held in a wide area in the vicinity of the concave-convex portion to perform the precise forming to the concave-convex portion with excellent precision even if the concave-convex portion and the rocking edge portion are positioned adjacent to each other. It is therefore possible to extend the life expectancy of the press working mold and to suppress the production cost of the element 12 while maintaining the work precision of the element 12. According to the production method of the power transmission belt according to the present invention, the material forming step is carried out in such a manner that the first plate thickness portion, the second plate thickness portion smaller in plate thickness than the first plate thickness portion, and the step portion between the first plate thickness portion and the second plate thickness portion are formed with the step portion having a step at the one side surface of the step portion, and the press forming step is carried out in such a manner that the plastic deformation amount of the material 20 for performing the precise forming of the rocking edge portion 21 and the concave-convex portion 22 is suppressed, thereby making it possible to enhance the work precision of the element 12 and the life expectancy of the press working mold. In this sense, the power transmission belt and the production method of the same according to the present invention is useful for materializing the power transmission belt in general and the production method of the same suitable particularly for the belt type continuously variable transmission.

EXPLANATION OF REFERENCE NUMERALS

2: primary pulley (pulley)
3: secondary pulley (pulley)
10: power transmission belt
11A, 11B: endless band-like ring
12: element
12A: arbitrary element
12b: back surface (other surface)
12F: other side element (other side element neighboring to the arbitrary element)
12P: one side element (one side element neighboring to the arbitrary element)
20: material
20a, 20b: thin plate material portion
20c: thick plate material portion
20d, 20e: band-like step portion
21: rocking edge portion
22: concave-convex portion
22a: convex portion
22b: concave portion
22c: outer circumferential surface
22d: annular corner surface
23a, 23b: side end surface portion
24: first plate thickness portion
24a: one side surface (one surface)
25: second plate thickness portion
25a: one side surface (one surface)
26: step portion
27: gentle inclination surface
28: concave portion
31, 32: hook portion (both shoulder portions)
35, 35m: curved inclination surface
35a, 35ma: one end
35b, 35mb: other end
51, 52: forming roll
61: punch
62: counter punch
63: projection pin
rw: radius of curvature of the curved inclination surface
t1, t2: plate thickness
θs, θms: maximum inclination angle

The invention claimed is:

1. A power transmission belt, comprising:
an endless band-shaped ring; and
a plurality of elements banded in an annular shape through the endless band-shaped ring,
each of the elements having both end surface portions to be in pressing contact with a pair of pulleys at its both sides in a belt width direction, a rocking edge portion serving as a fulcrum when rocked in the state that the elements are wound around the pulleys, and a concave-convex portion engageable in concave-convex engagement with the concave-convex portions of a pair of neighboring elements, and
each of the elements having a curved inclination surface formed between the rocking edge portion and the concave-convex portion to have an inclination angle reduced toward the concave-convex portion.

2. The power transmission belt as set forth in claim 1, in which the curved inclination surface has a radius of curvature larger than a step portion formed in the plate thickness direction of the element between the rocking edge portion and the concave-convex portion.

3. The power transmission belt as set forth in claim 2, in which the curved inclination surface is formed in the whole area of the step portion in the belt width direction, and the radius of curvature of the curved inclination surface is 0.4 mm or more.

4. A power transmission belt, comprising:
an endless band-shaped ring; and
a plurality of elements stacked in its plate thickness direction along the endless band-shaped ring and assembled with the endless band-shaped ring to be rockable in the plate thickness direction, each of the elements having a rocking edge portion engageable with one side element among a pair of neighboring elements, a concave-convex portion engageable in concave-convex engagement with the concave-convex portions of the pair of neighboring elements, and both end surface portions to be in pressing contact with a pair of pulleys at its both sides in a belt width direction,
each of the elements having a first plate thickness portion formed with the rocking edge portion, a second plate thickness portion formed with the concave-convex portion and smaller in plate thickness than the first plate thickness portion, and a step portion having a step formed on one of the surfaces of the element between the first plate thickness portion and the second plate thickness portion, the first plate thickness portion being formed with a gentle inclination surface inclined to have the plate thickness of the first plate thickness portion reduced toward the concave-convex portion from the rocking edge portion, the step portion being formed at least at a part in the belt width direction with a curved inclination surface inclined at a maximum inclination angle larger than that of the gentle inclination surface at the one end portion of the step portion adjacent to the gentle inclination surface and having an inclination angle reduced toward the second plate thickness portion, and the curved inclination surface being continuously extending on the surface of the second plate thickness portion at the other end portion of the step portion adjacent to the concave-convex portion.

5. The power transmission belt as set forth in claim 4, in which the curved inclination surface has a radius of curvature larger than the difference in plate thickness between the first plate thickness portion and the second plate thickness portion.

6. The power transmission belt as set forth in claim 4, in which the first plate thickness portion of the element is positioned at the outer circumferential side of the endless band-shaped ring, and the second plate thickness portion of the element is positioned at the inner circumferential side of the endless band-like ring.

7. The power transmission belt as set forth in claim 4, in which the first plate thickness portion of the element has a concave portion for receiving part of the endless band-shaped ring in opposite relationship with the concave-convex portion across the rocking edge portion.

8. The power transmission belt as set forth in claim 7, in which the first plate thickness portion of the element has the concave portion outwardly of the rocking edge portion at the outer circumferential side of the endless band-shaped ring and at the central portion of the element in the belt width direction.

9. A method of producing a power transmission belt comprising an endless band-shaped ring, and a plurality of elements stacked in its plate thickness direction along the endless band-shaped ring and assembled with the endless band-shaped ring to be rockable in the plate thickness direction, each of the elements having a rocking edge portion engageable with one side element among a pair of neighboring elements, a concave-convex portion engageable in concave-convex engagement with the concave-convex portions of the pair of neighboring elements, the method comprising:

a material forming step of partially flatly crushing a material of the element to form a first plate thickness portion, and a second plate thickness portion smaller in plate thickness than the first plate thickness portion, and a step portion having a step formed on one side surface of the element between the first plate thickness portion and the second plate thickness portion; and a press forming step of punching the element from the material of the element, partially flatly crushing the first plate thickness portion to form a gentle inclination surface inclined to have a plate thickness reduced toward the step portion, and the rocking edge portion, and partially plastically deforming the second plate thickness portion to form the concave-convex portion, the material forming step including shaping the step portion formed with a curved inclination surface inclined at a maximum inclination angle larger than that of the gentle inclination surface at the one end portion of the step portion adjacent to the gentle inclination surface and having an inclination angle reduced toward the second plate thickness portion, the curved inclination surface being continuously extending on the surface of the second plate thickness portion at the other end portion of the step portion adjacent to the concave-convex portion.

10. The method of producing a power transmission belt as set forth in claim 9, in which the press forming step further includes forming the concave-convex portion having a convex portion perpendicularly projecting from the one side surface of the second plate thickness portion, and a concave portion being perpendicularly recessed from the other side surface of the second plate thickness portion opposite to the one side surface of the second plate thickness portion, and an annular corner surface formed between the outer circumferential surface of the convex portion and the one side surface of the second plate thickness portion to have a radius of curvature smaller than that of the curved inclination surface, the annular corner surface and the curved inclination surface being connected with each other by part of the one side surface of the second plate thickness portion extending in parallel relationship with the other side surface of the second plate thickness portion.

11. The method of producing a power transmission belt as set forth in claim 9, in which the curved inclination surface is formed to have a radius of curvature larger than the difference in plate thickness between the first plate thickness portion and the second plate thickness portion in the material forming step.

12. The method of producing a power transmission belt as set forth in claim 9, in which the material forming step further includes preparing a steel plate preformed in a band-shaped shape as the material of the element, and roll working the material of the element to form the first plate thickness portion, the second plate thickness portion, and the step portion and to form the curved inclination surface extending in the longitudinal direction of the material of the element.

* * * * *